United States Patent [19]

Trotter

[11] Patent Number: 4,509,545
[45] Date of Patent: Apr. 9, 1985

[54] PORTABLE WASHING AND SPRAY ASSEMBLY

[76] Inventor: Lamar S. Trotter, 210 Sixth St., Bridgeport, Conn. 06607

[21] Appl. No.: 598,538

[22] Filed: Apr. 10, 1984

[51] Int. Cl.³ ............................................. B08B 3/02
[52] U.S. Cl. ..................................................... 134/199
[58] Field of Search ............... 134/198, 199, 151, 152, 134/153, 53, 55, 170, 171, 122 R, 122 P; 68/181 R, 208; 137/592

[56] References Cited

U.S. PATENT DOCUMENTS

| | | | |
|---|---|---|---|
| 353,849 | 12/1886 | Entrekin | 134/151 |
| 1,209,263 | 12/1916 | Clauss | 134/199 X |
| 2,651,312 | 9/1953 | McBeth | 134/199 X |
| 2,947,312 | 8/1960 | Heinicke | 134/199 X |
| 3,226,096 | 12/1965 | Ranson | 134/198 X |
| 3,499,792 | 3/1970 | Veith | 134/198 X |
| 4,072,157 | 2/1978 | Wines, Jr. et al. | 134/170 X |

Primary Examiner—Philip R. Coe
Attorney, Agent, or Firm—Thomas L. Tully

[57] ABSTRACT

An assembly of a washing container and a water supply attachment. The container is designed to maintain a continuous flow of washing liquid such as water at a constant level therein, and the attachment is designed to supply said continuous flow of washing liquid through a lower spray ring which causes the liquid in the container to flow upward towards the center of the liquid level, and through an upper spray ring which causes liquid to be sprayed down from above the surface of the liquid towards the center of the liquid level. Thus, items to be cleaned, placed in the liquid within the container, are caused to be circulated up from the bottom of the container towards the surface of the liquid and to be sprayed in a continuous manner to assist the cleaning thereof.

9 Claims, 4 Drawing Figures

PORTABLE WASHING AND SPRAY ASSEMBLY

BACKGROUND OF THE INVENTION

The present invention relates to an improved portable device for washing items such as vegetables, particularly vegetable greens, to remove dirt, sand, chemicals and other undesirable contaminants. Many people grow their own vegetables, and the cleaning of such vegetables, particularly greens such as lettuce, spinach, parsley, etc., is a time-consuming chore when done by hand in a sink or other container. Even store-purchased vegetables require such cleaning.

A variety of devices have been proposed to assist or facilitate the washing of items such as vegetables. For example, U.S. Pat. No. 1,248,139 discloses a dish pan comprising a constant level container having an upper spray ring designed for the rinsing of dishes lifted out of the water within the container. Also, U.S. Pat. No. 1,653,454 discloses an aeration attachment for wash tubs comprising a tubular ring which sits adjacent the bottom of the tub and has a plurality vertical orifices to introduce air up from around the bottom of the tub. Also, U.S. Pat. No. 4,173,051 discloses a vegetable washing assembly comprising a container having a drain at the base, and a spray insert having an upper spray ring and a central impeller. These devices are not satisfactory for the complete and automatic cleaning of items such as vegetables because they do not cause the items to be continuously recirculated through the washing liquid, while immersed therein, and/or do not cause the items to circulate upwardly towards the center of the surface of the washing liquid or to be sprayed at said surface to loosen stubborn contaminants.

SUMMARY OF THE INVENTION

The present invention relates to an assembly of a level-maintaining container and a liquid-supplying circulation attachment, the assembly being designed for continuous, unattended washing operation which causes immersed items to be continuously recirculated from the bottom of the container to the surface of the liquid therein and to be sprayed with fresh washing liquid at said surface in order to facilitate the removal of stubborn dirt and other contaminants, most of which are released from the container through the level-maintaining drain(s).

Figure 1:
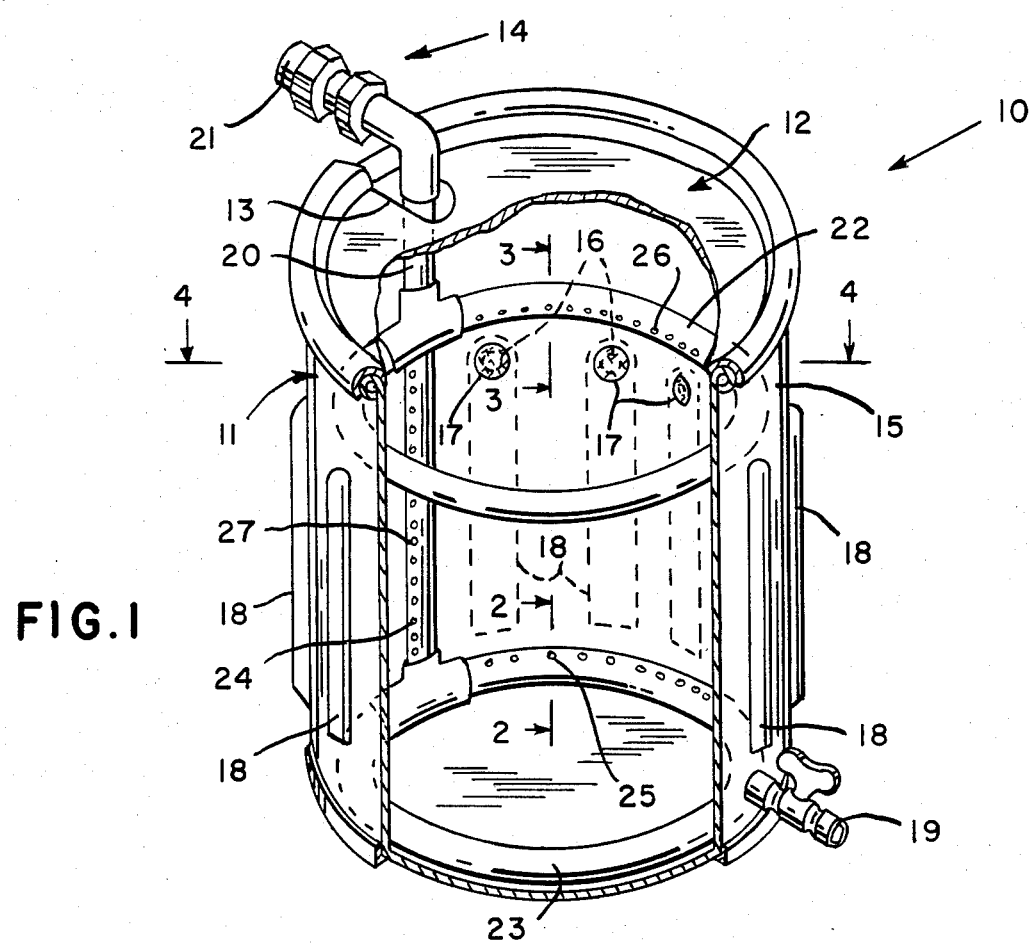
FIG. 1 is a perspective view, partially in section, of a portable washing and spray assembly according to one embodiment of the present invention.

Referring to the drawing, the assembly 10 of FIG. 1 comprises a level-maintaining container 11 having a removable cover 12, shown in raised position for illustration purposes, provided with a peripheral slot 13, and a liquid-supplying attachment 14 designed to be received within the container 11 and within the cover slot 13 when the cover 12 is secured to the container 11. The container 11, such as a five-gallon metal drum, has a cylindrical wall 15 provided with a plurality of peripheral drain holes 16, each covered with a filter screen 17, the holes 16 being located about one-quarter of the height of the container wall down from the top thereof so as to provide a plurality of peripheral overflow outlets which permit the container 11 to be filled with washing liquid to about three-quarters capacity and to be maintained at that level while a continuous flow of washing liquid, such as water is introduced through the spray conduit attachment 14. Each of the drain holes 16 opens into a vertical drain tube 18 attached to and extending down the outer wall of the container 11 to direct the overflow down near the base of the container 11. Also, the container 11 is preferably provided with a drain valve 19, adjacent the base thereof, to facilitate the removal of water and sediment after use.

The liquid-supplying attachment 14 comprises a tubular vertical upper conduit 20 having a hose-attachment fitting 21 at the inlet end or terminus thereof, and a pair of parallel upper and lower spray rings 22 and 23, respectively, connected and supported by a vertical lower spray conduit section 24, rings 22 and 23 having diameters slightly smaller than the inner diameter of the container 11. The spacing between the spray rings 22 and 23 is such that the upper spray ring 22 is maintained at least slightly above the level of the liquid in the container when the lower spray ring 23 is seated on the floor of the container 11.

Figure 2:
FIGS. 2 and 3 are views taken along the lines 2—2 and 3—3, respectively, of FIG. 1.

The spray rings 22 and 23 are provided with radial spray orifices 25 and 26, respectively, while the vertical lower conduit section 24 is provided with radial spray orifices 27. As shown most clearly by FIG. 2, the spray orifices 25 in the lower spray ring 23 are uniformly positioned around the inside surface of the ring 23 at an angle between horizontal and vertical, preferably about midway therebetween, i.e., about 45° up from the horizontal, so as to emit the water in a conical pattern upwardly towards the center of the level of the water in the container. This creates a circulation current of the water in the container from the bottom of the container upwardly to the center of the water level, which current moves items which are suspended in the water along such path.

Figure 3:
Figure 4:
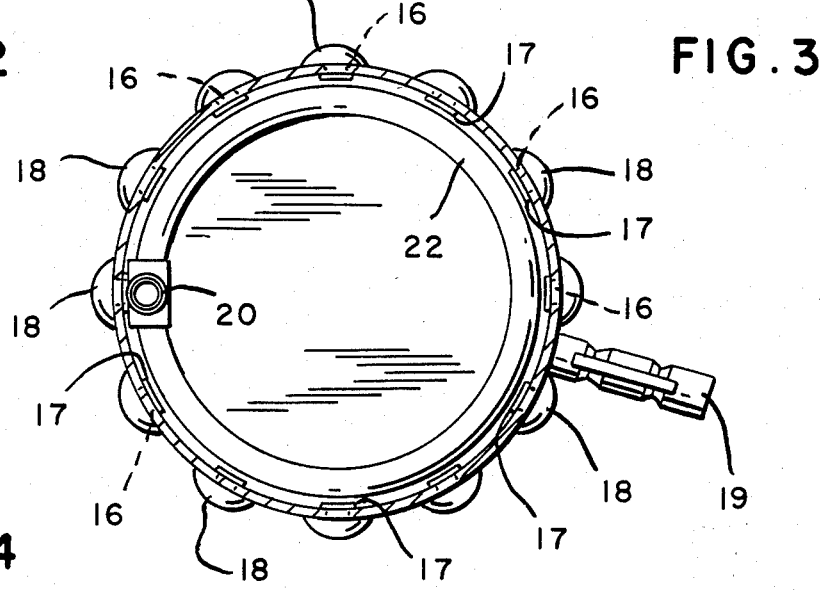
FIG. 4 is a view taken along the line 4—4 of FIG. 1.

Also, as shown most clearly by FIG. 3, the spray orifices 26 in the upper spray ring 22 are uniformly positioned around the inside surface of the ring 22 at an angle between horizontal and vertical, preferably about midway therebetween, i.e., about 45° down from the horizontal so as to emit the water in a conical pattern downwardly against the surface of the liquid in the container, generally towards the center thereof. This causes an agitation of the water at said surface and a continuous spraying of items which are circulated to said surface by the current generated by the spray orifices 25 in the lower spray ring 23.

The vertical lower spray conduit section 24 is provided with a row of spray orifices 27 along one side thereof, in a direction tangential to the rings 22 and 23, so as to create a rotary flow of the washing liquid within the container. Such flow causes dirt particles, which are floating or suspended in the liquid, to be drawn outwardly towards the inner wall of the container where they are flushed out through the drain screens 17, drain holes 16 and drain tubes 18. The drain screens 17 prevent the items, such as scraps of greens, parsley, etc., from being drawn into and clogging the drain holes 16 and/or tubes 18.

As is clear from the foregoing, the present assembly 10 can be positioned in a sink, or outdoors near a garden, filled with vegetables to be washed, connected to a hose under low or moderate water flow and left unattended for the necessary period of time to clean the vegetables of dirt, chemicals and all other surface contaminants. Most of the contaminants will be circulated upwardly towards the center of the surface by the current generated by the water introduced through the holes 25 in the lower ring 23, and then outwardly towards the drain holes 16 by the current generated by the water introduced through the holes 27 in the vertical section 24. Any other contaminants will settle to the floor of the container which, if desired, may be provided with a slightly-elevated screen to support the lower ring 23 and the items being cleaned and to permit contaminants such as sand to filter through the screen to the container floor.

The container cover 12 only serves to keep the container clean of dust, dirt or other outside contaminants during storage and/or during use, particularly out-of-doors.

The fitting 21 of the spray conduit attachment 14 may be a conventional threaded female element, a snap-on connector or other secure attachment means designed to mate with a companion fitting on a water hose.

FIG. 1 also illustrates the presence of a drain valve 19, near the bottom of the container 11, which facilitates the emptying of the container 11 and the flushing of sand or other sediment from the floor of the container after use. Alternatively, a plug may be used in such position or in the floor of the container.

While the present portable assembly is particularly wellsuited for the washing of vegetables, particularly lightweight vegetables such as greens which can be suspended in the water currents and continuously circulated for the most efficient cleaning action, it will be apparent to those skilled in the art that a variety of other items can be washed and cleaned in the present assembly. Even heavy items, which may not be circulated with the water currents, can be cleaned efficiently with the present assembly since the water currents cause the dirt to be removed from such items and to be circulated up and out of the drain holes.

I claim:

1. Portable washing and spray assembly designed to receive a continuous flow of cleaning liquid, such as water, and to circulate, wash and spray articles placed therein, said assembly comprising a container having a floor and a wall, at least one overflow opening in said wall located a predetermined distance above said floor in order to maintain the volume of water within said container at a predetermined level, and a water supply attachment comprising a vertical conduit section communicating with and supporting a parallel pair of spaced horizontal conduit spray rings comprising a lower spray ring designed to be supported adjacent the floor of the container and being provided with a plurality of radial spray holes inclined upwardly at an angle between horizontal and vertical towards the center of the container, and an upper spray ring which is supported by said vertical conduit in a position spaced above said lower spray ring by a distance greater than the height of said overflow opening above the floor of said container, said upper spray ring being provided with a plurality of radial spray holes declined downwardly at an angle between horizontal and vertical towards the center of the container, said vertical conduit being designed to receive a continuous flow of water and to transmit said flow through said upper and lower spray rings and radial openings to fill said container to its overflow opening(s), to generate a water current from the bottom of said container upwardly towards the center thereof, and to generate a water spray from above the level of the water in the container towards the center thereof.

2. An assembly according to claim 1 in which said container is cylindrical and said spray rings are circular and have diameters slightly less than the inner diameter of the container.

3. As assembly according to claim 1 in which said vertical conduit section is provided with a plurality of radial spray holes in a direction tangential to said spray rings in order to generate a rotary water current within said container.

4. An assembly according to claim 1 in which a plurality of uniformly-spaced overflow openings are provided around the entire wall of said container.

5. An assembly according to claim 1 in which each said overflow opening is provided with a filter screen which permits the passage of fine dirt particles.

6. An assembly according to claim 1 in which said container includes a vertical drain tube attached to the outer surface thereof in communication with each said overflow opening in order to direct overflow water to the base of the container.

7. An assembly according to claim 1 in which said container includes a drain element adjacent the base thereof.

8. An assembly according to claim 1 in which said container includes a cover having a peripheral opening designed to accommodate the vertical conduit of the water supply attachment.

9. An assembly according to claim 1 in which the vertical conduit of the water supply attachment has a terminus comprising a fitting designed for attachment to a water source.

* * * * *